Jan. 9, 1940.   E. A. TUBBS   2,186,184
CIRCUIT ALIGNING DEVICE AND METHOD OF ALIGNING CIRCUITS
Filed Feb. 26, 1937   2 Sheets—Sheet 1
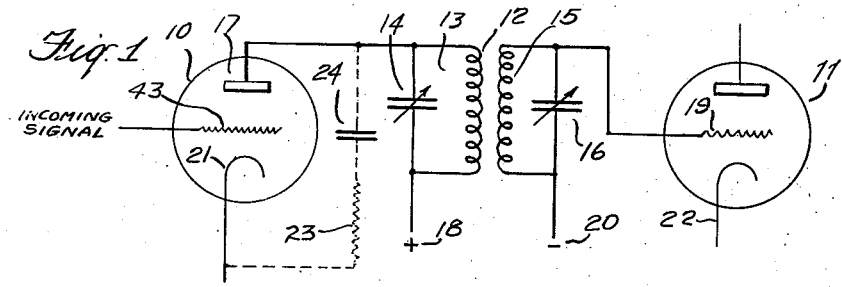
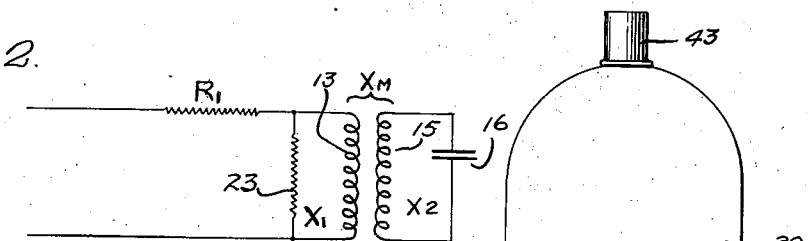
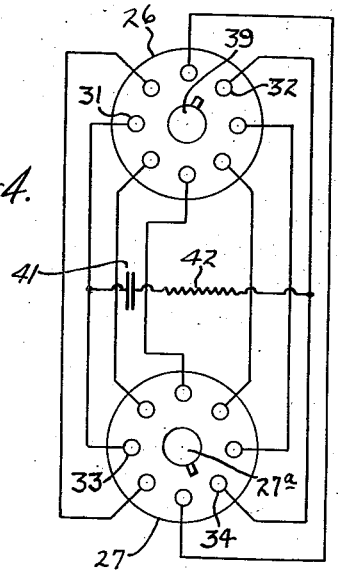
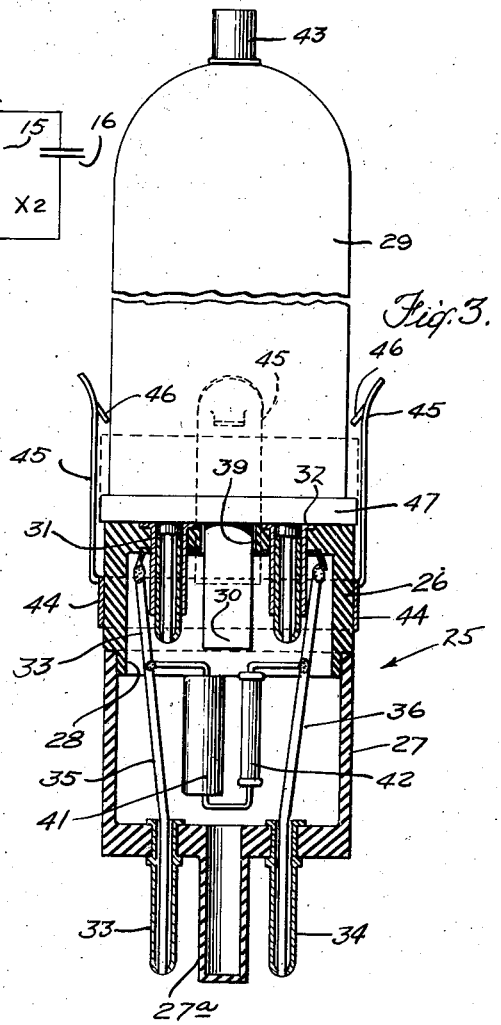
INVENTOR
ERNEST A. TUBBS.
BY
Braselton Whitcomb & Davies
ATTORNEYS Jan. 9, 1940. E. A. TUBBS 2,186,184
CIRCUIT ALIGNING DEVICE AND METHOD OF ALIGNING CIRCUITS
Filed Feb. 26, 1937 2 Sheets-Sheet 2
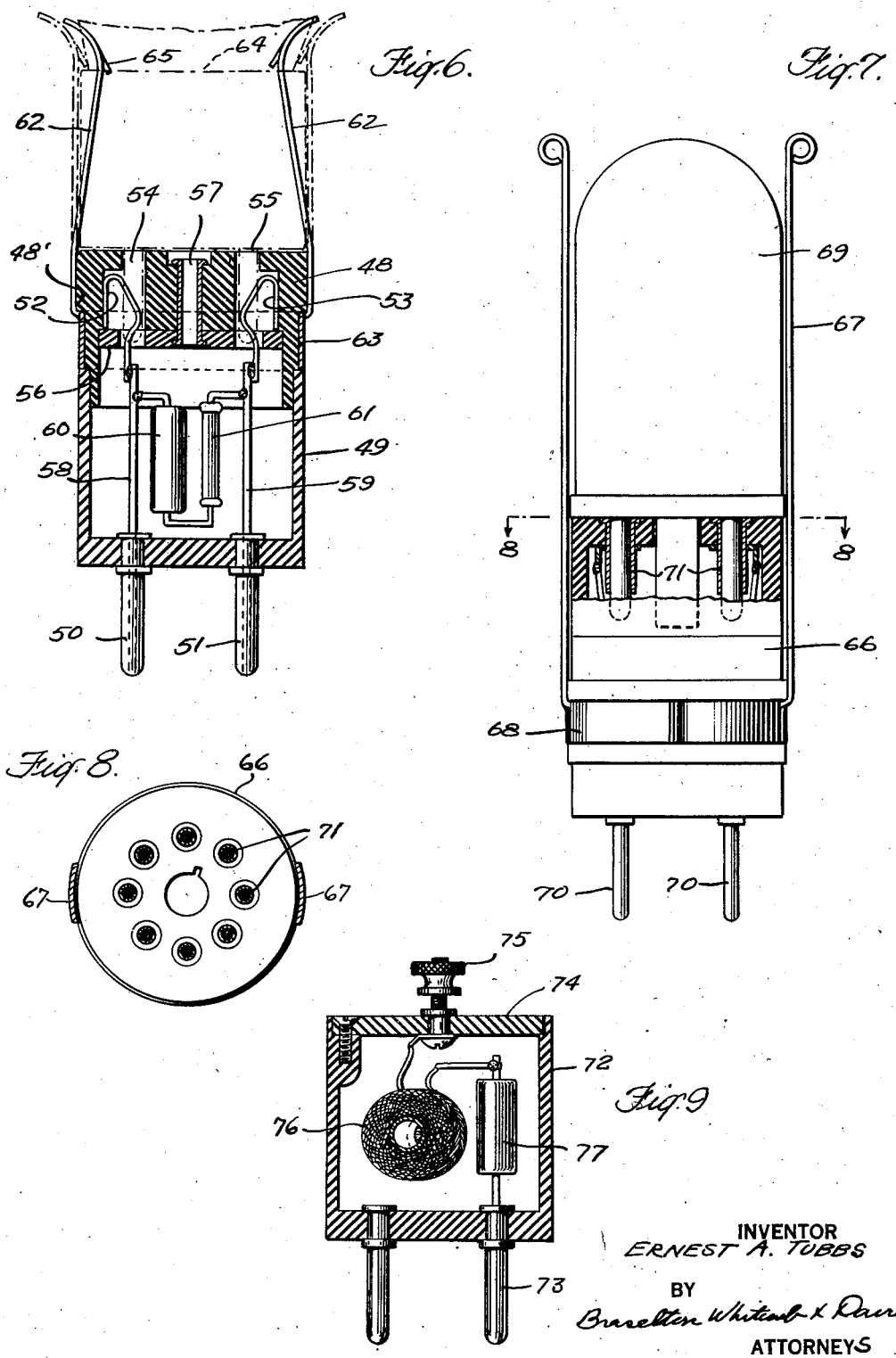
INVENTOR
ERNEST A. TUBBS
BY
ATTORNEYS Patented Jan. 9, 1940

2,186,184

UNITED STATES PATENT OFFICE 2,186,184

CIRCUIT ALIGNING DEVICE AND METHOD OF ALIGNING CIRCUITS

Ernest A. Tubbs, Long Island City, N. Y., assignor to National Television Corporation, Wilmington, Del., a corporation of Delaware Application February 26, 1937, Serial No. 127,876

18 Claims. (Cl. 250—20)

This invention relates to a method of aligning circuits and to a device to be used in connection therewith, and is especially adapted for use in the testing and servicing of radio receiving sets designed to reproduce a wide band of signal frequencies.

One of the objects of the invention is to provide a simple and quick method of accurately aligning the tuned coupled circuits of high frequency amplifying apparatus.

Another object of the invention is to provide a device which may be used for quickly and accurately aligning the tuned coupled circuits of high frequency amplifying apparatus.

Another object of the invention is to provide a simple device, which may be introduced, like an adapter, between a tube and its socket, for aligning the tuned coupled high frequency circuits of radio receivers without cutting in to the wiring.

Other objects of the invention and objects relating particularly to the method of constructing and assembling the various parts will be evident as the description of the invention proceeds.

The invention is illustrated in the accompanying drawings, in which:

Fig. 1 is a circuit diagram of simple coupled circuits which may be employed in a radio receiver or other amplifying device;

Fig. 2 is a simplified electrical diagram of the equivalents of the circuit of Fig. 1;

Fig. 3 is a sectional elevational view of a device embodying certain features of the invention;

Fig. 4 is a circuit diagram of the connections in the device of Fig. 3;

Fig. 5 is a fragmentary elevational view of the device of Fig. 3;

Fig. 6 is a sectional elevational view of a modified form of the device of Fig. 3;

Fig. 7 is an elevational view partly in section of a modified form of the device;

Fig. 8 is a sectional plan view of the device of Fig. 7, taken on the line 8—8 of that figure; and Fig. 9 is a sectional elevational view of a device incorporating a modified form of the invention.

In high frequency amplifying apparatus employing coupled circuits, these circuits may be sharply tuned or they may have a certain breadth of tuning, giving a wide resonance curve and permitting them to pass a wider band of signal frequencies. The coupling of these circuits may be subject to considerable variation to produce different results. Optimum coupling is considered to be that represented by the equation:

$$\frac{X_m^2}{R_1 R_2} = 1$$

where $X_m$ equals the mutual or coupling reactance between the circuits and $R_1$ and $R_2$ are the effective resistances of the primary and secondary circuits respectively. Circuits with less than optimum coupling are usually fairly easy to tune as the resultant resonance curve forms a peak, but circuits with more than optimum coupling, usually referred to as "overcoupled circuits", because of their broad topped curves, have been heretofore practically impossible to tune accurately even with the use of an oscilloscope.

My invention, therefore, comprehends, in its broadest scope, a method and a device by means of which certain values of one of a pair of coupled circuits may be temporarily altered in such a manner as to permit accurate tuning of the secondary circuit, whereupon the proper values may be restored and the primary circuit may be accurately tuned. The manner in which this temporary alteration of the values in one circuit may be accomplished will best be understood by the following explanation, taken in connection with Figs. 1 and 2 of the drawings.

In Fig. 1 a pair of thermionic tubes 10 and 11 are shown coupled together inductively by the transformer 12, comprising a primary coil 13, tuned by the variable condenser 14, and a secondary coil 15, tuned by the variable condenser 16. One end of the primary coil 13 and condenser 14 may be connected to the plate 17 of the tube 10, while the other end is given a positive potential as at 18. One end of the coil 15 and condenser 16 may be connected to the grid 19 of the tube 11, while the other end is given a negative potential, as at 20. The cathodes 21 and 22, respectively, of the tubes 10 and 11 may be connected to ground and to the negative side of the source of potential 18 and the positive side of the source of potential 20. This circuit forms the usual radio frequency amplifying circuit in a radio set and may represent either the intermediate stages in a super-heterodyne or ordinary tuned radio frequency circuits. Three element tubes have been shown for simplicity but any type of multi-element tube may of course be used. For the purpose of the invention the coils may be considered to be broad and somewhat overcoupled.

If the condenser 14 is turned to its outermost position so that it has a minimum capacity, then the circuit may have an electrical equivalent similar to what is illustrated in Fig. 2. In this figure the plate-cathode resistance of the tube 10 may be represented by the resistance $R_1$. The reactance $X_2$, in the secondary circuit, including the coil 15 and condenser 16, for maximum current in this circuit may then be approximately determined by the following formula:

$$X_2 = \frac{X_m^2 X_1}{X_1^2 + R_1^2}$$

Where $X_m$ equals the mutual or coupling reactance between the circuits, $X_1$ equals the reactance of the primary circuit, and $R_1$ equals the effective resistance of the primary circuit.

The secondary circuit is of course tuned to resonance, (the desired condition), when the reactance $X_2$ of the secondary circuit is zero; hence, any alteration of the values in the circuit which will make $X_2$ equal zero or approach zero will tend to give the desired condition permitting the secondary to be independently tuned to resonance. If $R_1$, for instance, were to be made very large, then $X_2$ would approach zero, The effect of increasing $R_1$ is to dampen the circuit. A small resistance across the coil also tends to dampen the circuit and appears to produce the same result as increasing $R_1$.

Hence one feature of the invention comprehends the use of a resistance 23 across the primary coil 13 having such a value that the effect will be to reduce the reactance of the secondary circuit to a value approaching zero so that the current therein may reach a maximum when the secondary circuit is exactly in resonance.

In order to connect a resistance across the coil 13 and not cut into the circuit I prefer to connect this resistance 23 between the plate and cathode of the tube, the plate circuit of which is connected to the primary coil 13, and to avoid shorting the battery or other source of potential directly through this resistance I insert a fairly large condenser 24 in series therewith. This is the equivalent of placing the resistance across the coil 13. Inasmuch as the resistance 23 and condenser 24 are connected between the plate and cathode, the plate and cathode terminals of the tube provide a convenient means to make the connection. I therefore preferably provide a separate device which may be plugged into the tube socket and which may in turn have the tube plugged into it, and this device may contain the resistance and condenser connected across the plate and cathode leads.

One manner in which this device may be constructed is illustrated in Figs. 3 to 5 inclusive wherein a container 25 is shown comprising a receptacle member 26, adapted to receive the prongs of the thermionic tube, and a plug member 27, provided with prongs to insert into a tube socket. Both the members 26 and 27 may be hollow, the former being provided, if desired, with a downwardly extending sleeve 28 adapted to snugly fit inside of the open rim of the latter.

The device of Fig. 3 is shown arranged to be used with a so-called metal tube 29, the base of which has a central extending member 30 adapted to guide the prongs into their proper receptacles. The member 26 may be provided with a plurality of these receptacles, two of which, 31 and 32, which are the plate and cathode terminals respectively, are shown in Fig. 3. The other terminals are for the other elements of the tube and need not be specifically described, except that they are connected to the corresponding prong terminals in the member 27.

The member 27 has the proper number of prongs, among them being two prongs 33 and 34 which correspond to the plate and cathode prongs respectively of the thermionic tube, and which are also directly connected respectively, within the members 26 and 27, to the receptacles 31 and 32 by means of the wires 35 and 36. These wires, as well as the other connecting wires within the members 26 and 27 may preferably be made rigid so as to prevent rotation of the member 26 with respect to the member 27 when the device is assembled, or if desired, the member 26 may have a tongue 37 (Fig. 5) adapted to fit into a recess 38 in the member 27 to accomplish the same purpose. The receptacle member 26 may also be provided with the central opening 39 to receive the guide member 30 of the tube, while the member 27 has a guide member 27a.

Within the members 26 and 27, which together form a hollow shell, I place the condenser 41 and resistor 42 in series with each other and connected between the wires 35 and 36, as clearly shown. The value of resistance 42 may be varied somewhat depending on the coils used. It should be small enough so as to reduce the effect of the inductance 13, while at the same time permitting sufficient energy transfer between the coils to obtain a satisfactory output current. In one instance, where very satisfactory results were obtained, I used a resistor of 1,000 ohms and connected it in series with a condenser of .01 microfarad.

In the operation of the device, where it is desired to align the tuned coupled circuits in a radio receiver, it is only necessary for the operator or service man to remove the tube which is connected to the primary coil of the transformer, insert it into the receptacle member of the device of the invention, insert the device and tube into the tube socket, and detune the primary condenser to its zero position. With the device introduced into the set in this manner between the tube and the tube socket the resistance 42 and condenser 41, corresponding to resistance 23 and condenser 24, shown in dotted lines in Fig. 1, will be connected as indicated in Figs. 1 and 4, and the output of a signal generator or other source of current at the desired high frequency, may then be connected to the grid terminal 43 of the tube. The tuning condenser for the secondary circuit may then be adjusted for maximum output signal current, at which time the secondary circuit will be properly tuned to the desired frequency.

The tube and device are then removed from the tube socket, separated, and the tube reinserted in the socket, whereupon the primary circuit will be restored to its normal condition and may then be tuned for maximum volume in the output of the set, which will determine the alignment of the primary circuit. The service man then repeats this procedure for each pair of coupled circuits and is thus able to quickly and accurately align the various circuits of the set without cutting in or otherwise disturbing the wiring.

In some instances the presence of the resistance across the primary coil dampens the circuit sufficiently so that the primary tuning condenser appears to have little effect on the circuit and may be entirely neglected when using the aligning device.

If the circuits are greatly overcoupled so that a saddle-top composite curve is produced, it may be necessary to shift the frequency of the signal generator back and forth through the desired frequency, while tuning the primary, until the primary circuit is tuned so that changing of the frequency of the signal generator in either direction from the desired frequency will increase the output current as either side of the saddle-top curve is approached. In other words, the combined circuit is tuned by the adjustment of the primary in such a manner that the desired frequency lies at the center of the dip in the resonance curve. If this procedure is followed an extremely accurate setting of both circuits may be achieved. It is not necessary with circuits of looser coupling.

It should be particularly noted that, proceeding in accordance with the method of the invention, the tuning of the secondary circuit is preferably not changed after once being tuned with the aid of the aligning device. Any attempt to adjust the secondary circuit after the primary has been restored to normal may result in throwing the secondary completely out of alignment.

When using this device to align sets, it is desirable that, after the device and the tube are plugged into the set and the adjustments made, both the tube and the device may be withdrawn from the set as one unit, as in many receiving sets the tubes are very closely positioned and it might prove extremely difficult to grasp the aligning device alone in order to remove it. I therefore desire to insure that the tube and device remain together as one unit until after they have been removed from the set.

In Fig. 3 I have shown one manner of accomplishing this result. A ring 44 may be provided around the member 26 and rigidly secured thereto as by a tight fit. A pair of arms 45 may be formed integral with the ring 44 and may extend upwardly beyond the bottom edge of the tube, curving slightly outwardly at their upper ends. Small fingers 46 may be preferably struck in from the arms 45 at points near the upper ends thereof, and may act to engage a flange 47 formed on the base of the tube 29. In order to insure the fingers 46 engaging other types of tubes which may have flanges of different widths, I preferably arrange the fingers high enough on the arms 45 so that they will be sure to engage the highest of any of the tubes with which the device is to be used. When the service man withdraws the combined tube and aligning device from the set he has only to grasp the tube, whereupon the tube base will engage the fingers 46 and the aligning device will also be withdrawn. Simply spreading the arms 45 slightly will then permit him to separate the tube from the aligning device.

In Fig. 6 I have shown the aligning device adapted to receive a tube with the type of base ordinarily used on glass tubes, and without having the guiding central member shown on the tube of Fig. 3. The device of Fig. 6 comprises a receptacle member 48 and a plug member 49, which may fit together similarly to the members 26 and 27 of Fig. 3. The plug member 49 may have contact prongs 50 and 51, the former adapted to fit into the plate receptacle of a tube socket, and the latter adapted to fit into the cathode receptacle of the same socket. Other prongs are of course provided, but are not shown in this figure. The receptacle member 48 may have a plurality of contact clips 52 and 53 set into suitable recesses 54 and 55 adapted to receive the plate and cathode prongs of an ordinary glass tube, the clips 52 and 53 being held in place by means of an insulating disc 56 which may be attached to the upper part of the member 48 by means of a tubular rivet 57. The clips 52 and 53 may be connected by means of wires 58 and 59 to the contact prongs 50 and 51 at the base of the device, the other prongs and receptacles being similarly connected. The condenser 60 and the resistance 61 may be connected in series, as shown, between the wires 58 and 59.

In this arrangement also I provide a pair of upstanding arms 62 attached to a band 63 which may be fitted tightly around the receptacle member 48, which in this instance is shown with a shoulder 48' to prevent the ring from slipping up. Inasmuch as this device is adapted to be used with a glass type of tube having a large base 64, as shown in dotted lines, I make the arms 62 longer so that the fingers 65 at the top thereof may engage the top of the tube base. The device works in exactly the same manner as that shown in the previous figures.

In Fig. 7 I have shown another modified form of the apparatus in which the container 66 may be provided with a plurality of long upright spring members 67, which may be formed integral with a band 68 adapted to fit snugly around the body of the device. These arms 67 are adapted to extend upwardly alongside the tube 69, shown inserted in the device in such a manner that the tube cannot be grasped without the hand engaging the uprights 67. The operator in grasping the tube 69 to remove the combination from the radio set must necessarily grasp the arms 67, and hence he will remove both together from the set.

In Figure 7 I have also illustrated another modification which may be advantageously used in connection with the invention. In some cases it may be preferred to construct the prongs 70 on the base of the container 66 so that they will have a slightly smaller diameter than the prongs of the tube with which it is to be used. The receptacles 71 in the upper end of the device may then be made the standard size to tightly fit the prongs of the tube. With this arrangement the base prongs 70 will fit loosely into the radio tube socket while the tube itself will fit tightly into the top of the device. Hence any attempt to pull the tube upwardly will also pull the aligning device out of the set. With this arrangement, of course, the arms 67 need not be used.

As already stated, any alteration of value which will tend to make the reactance of the secondary circuit equal or approach zero when the circuit is tuned to resonance and still permit sufficient energy to flow therein may be advantageously used for the purpose of the invention. In Fig. 9 I have shown a device which appears to function in accordance with the following explanation:

Referring again to the equation for the reactance of the secondary circuit, $R_1$ represents the resistance of the primary circuit and may be considered to be the plate-cathode resistance of the tube. Hence if the tube is removed $R_1$ is reduced to a very low value. This leaves $X_1$ substantially alone as the denominator and therefore if $X_1$ can be made large enough the value of $X_2$ can be made to approach zero.

The value of $X_1$ may be increased by adding inductance to the circuit, and the device of Fig. 9 is intended to be used for this purpose. A container 72, preferably made of insulating material, may have a plurality of prongs extending from the bottom thereof and adapted to fit into a tube socket, one prong 73 of which corresponds to the plate terminal of the tube. The top of the container may be closed by a disc 74 which may carry a terminal 75 for making connection to a signal generator. Between the terminal 75 and the prong 73 I may connect an inductance 76 in series with a condenser 77.

This container 72 may be plugged into a tube socket in place of the tube, whereupon the inductance 76 is then in series with the coil in the plate circuit of the tube. The condenser 77 may be used chiefly for the purpose of preventing shortcircuiting the source of plate current supply. If then a signal generator or other source of current at the desired frequency be connected between the terminal 75 and the chassis of the set, the secondary circuit may be tuned to resonance at the proper frequency by tuning for maximum output. The procedure for completing the adjustment is then as previously described.

While the inductance 76 may be found desirable, in many instances the inductance of the circuit may be large enough for all practical purposes, in which case the inductance 76 in the container 72 may be omitted.

From the above it will be seen that I have provided a very simple device to be used in aligning a radio set which the service man can simply insert between a tube and its socket. With the devices of Figs. 1 to 8 inclusive the radio tube is used in its normal way, and if desired, the service man may attach the output of a signal generator to the grid of the tube mounted on the aligning device, or to any preceding stage as desired, or he may merely use an incoming radio signal for making the adjustment. With the device of Fig. 9, however, the signal generator or other source of desired high frequency current is intended to be connected directly to the device without passing through any prior stages. With any of the arrangements shown, however, there is no necessity for cutting into the circuit, and a set may be quickly and accurately aligned by this method using any of the devices.

Many modifications of the invention may be made without departing from the spirit thereof, such as the alteration of other values of the coupled circuits or the equivalent, so as to reduce the value of $X_2$ in the equation sufficiently to obtain the desired results, and I do not, therefore, desire to limit myself to what is shown and described except as such limitations occur in the appended claims.

What I claim is:

1. The method of aligning coupled primary and secondary circuits, the primary circuit including a primary coil, which comprises inserting a resistance across the primary coil, applying a voltage of a predetermined frequency to the primary circuit, tuning the secondary circuit for maximum current output, removing the resistance from the primary circuit, and tuning the primary circuit for maximum output from the secondary circuit.

2. The method of aligning coupled primary and secondary circuits in a radio amplifier, the primary circuit including a primary coil, which comprises inserting a resistance in the neighborhood of 1000 ohms across the primary coil, introducing a voltage at a predetermined frequency to the primary circuit, tuning the secondary circuit for the maximum current response therefrom, removing the resistance from the primary circuit, and tuning the primary circuit for the maximum current response in said secondary circuit.

3. The method of aligning coupled primary and secondary circuits in an amplifier, the primary circuit including a primary coil, which comprises inserting a resistance and a condenser in series across the primary coil, applying a voltage at a predetermined frequency to said primary circuit, tuning said secondary circuit for the maximum current response therein, removing the resistance and condenser from the primary circuit, and tuning the primary circuit for the maximum response in the secondary circuit.

4. The method of aligning tuned high frequency primary and secondary circuits in a radio set in which the primary is connected in the plate circuit of a thermionic tube having a cathode, a grid, and a plate, which comprises introducing a resistance between the plate and cathode of said thermionic tube, applying a voltage at a predetermined frequency to the grid of said tube, tuning said secondary circuit for maximum current response, removing said resistance, and tuning said primary circuit for maximum current response in said secondary circuit.

5. The method of aligning high frequency primary and secondary circuits in a radio set with the primary connected in the plate circuit of a thermionic tube having a cathode, a grid, and a plate, which comprises introducing a resistance and a condenser in series between the plate and cathode of said tube, applying a voltage varying at a predetermined frequency to the grid of said tube, tuning the secondary circuit for maximum current response therein, removing the resistance and condenser, and tuning the primary circuit for maximum current response in the secondary circuit.

6. The method of aligning the tuned circuits in a high frequency amplifier, including a primary and a secondary circuit, the primary circuit being connected in the plate circuit of a thermionic tube, which comprises introducing a resistance of approximately one thousand ohms and a condenser of approximately .01 microfarads connected in series between the plate and cathode terminals of said tube, applying a voltage varying at a predetermined frequency to the grid of said tube, tuning the secondary circuit for maximum current response therein, removing the resistance and condenser, and tuning the primary circuit for maximum current response in the secondary circuit.

7. The method of aligning coupled primary and secondary circuits which comprises applying a voltage at a predetermined frequency to said primary circuit through a resistance, tuning said secondary circuit for maximum current response, applying the voltage in a normal manner to the primary circuit, and tuning the primary circuit for maximum current response in the secondary circuit.

8. An aligning device for coupled high frequency circuits comprising a container, a plurality of prongs on one end of said container adapted to fit into a thermionic tube socket, a plurality of receptacles on the other end of said container adapted to receive the prongs of a thermionic tube, a resistance and a condenser mounted within said container and connected in series between two of said receptacles, and means to connect each of said two receptacles directly to a different one of said prongs.

9. A device to be used for aligning high frequency circuits comprising a container, a plurality of prongs on one end of said container adapted to be inserted in a thermionic tube socket, a plurality of receptacles on the other end of said container adapted to receive the prongs of a thermionic tube, a condenser and a resistance mounted within said container and connected in series between two of said receptacles, said resistance having a value of approximately one thousand ohms, and means to connect each of said two receptacles directly to a different one of said prongs.

10. A device for aligning coupled high frequency circuits which comprises a container, a plurality of prongs mounted on said container and adapted to fit into a thermionic tube socket, a plurality of receptacles on said container adapted to receive the prongs of a thermionic tube, a resistance within said container, a condenser within said container, said resistance and condenser being connected in series between two of said receptacles, means to connect each of said two receptacles directly to a different one of said prongs, and means to releasably lock a thermionic tube to said container when said tube prongs are inserted in said receptacles.

11. A device to be used for aligning high frequency coupled circuits which comprises a container, a plurality of prongs on said container adapted to fit into a thermionic tube socket, a plurality of receptacles on said container adapted to receive the prongs of a thermionic tube, a condenser within said container, a resistance within said container, said condenser and resistance being connected in series between two of said receptacles, the value of said resistance being approximately one thousand ohms, means to connect each of said two receptacles directly to a different one of said prongs, and means to releasably lock a thermionic tube to said container when the tube prongs are inserted into said receptacles.

12. A device to be used for aligning high frequency coupled circuits which comprises a container, a plurality of prongs on said container adapted to fit into a thermionic tube socket, a terminal on said container, an inductance within said container, and a condenser within said container, said inductance and condenser being connected in series between one of said prongs and said terminal.

13. A device to be used for aligning high frequency coupled circuits which comprises a container, a plurality of prongs on said container adapted to fit into a thermionic tube socket, a terminal on said container, and a condenser connected between said terminal and one of said prongs.

14. The method of aligning coupled primary and secondary high frequency circuits which comprises altering one of said circuits so as to reduce the reactance of said secondary circuit when said secondary circuit is in resonance, applying a voltage at a predetermined frequency to said primary circuit, tuning said secondary circuit for its maximum output current, restoring the altered circuit to its normal value, and tuning said primary circuit for the maximum output of said secondary circuit.

15. The method of aligning primary and secondary tuned circuits which comprises damping said primary circuit, applying a voltage to said primary circuit at a predetermined frequency, tuning said secondary circuit for maximum output current, restoring said primary circuit to its normal value, and tuning said primary circuit for maximum output of the secondary circuit.

16. The method of aligning primary and secondary tuned circuits which comprises adding inductance to said primary circuit, applying a voltage at a predetermined frequency to said primary circuit, tuning said secondary circuit for maximum output, removing said additional inductance from said primary circuit, and tuning said primary circuit for maximum output of said secondary circuit.

17. The method of aligning primary and secondary tuned circuits which comprises adding inductance to said primary circuit, connecting a signal generator across the total inductance of said primary circuit, tuning said secondary circuit for maximum output current, removing said additional inductance, applying voltage from said signal generator to said primary circuit, and tuning said primary circuit for maximum output of said secondary circuit.

18. The method of aligning greatly overcoupled tuned high frequency primary and secondary circuits which comprises altering one of said circuits so as to reduce the reactance of said secondary circuit when said secondary circuit is in resonance, applying a voltage at a predetermined frequency to said primary circuit, tuning said secondary circuit for maximum output current, restoring said altered circuit to its normal condition, and tuning said primary circuit for a point at which the current in the secondary will increase when the frequency of the applied voltage is changed in either direction.

ERNEST A. TUBBS.